(12) United States Patent
Scopazzi

(10) Patent No.: US 12,417,432 B2
(45) Date of Patent: *Sep. 16, 2025

(54) SYSTEM AND METHOD FOR IDENTIFYING VEHICLES FOR A PURCHASER FROM VEHICLE INVENTORIES

(71) Applicant: 2116966 Ontario Inc., Barrie (CA)

(72) Inventor: Darren John Scopazzi, Barrie (CA)

(73) Assignee: Mobials Inc., London (CA)

( * ) Notice: Subject to any disclaimer, the term of this patent is extended or adjusted under 35 U.S.C. 154(b) by 297 days.

This patent is subject to a terminal disclaimer.

(21) Appl. No.: 17/938,729

(22) Filed: Oct. 7, 2022

(65) Prior Publication Data

US 2023/0104526 A1    Apr. 6, 2023

Related U.S. Application Data

(63) Continuation-in-part of application No. 16/544,353, filed on Aug. 19, 2019, now Pat. No. 11,508,007, which is a continuation-in-part of application No. 15/852,938, filed on Dec. 22, 2017, now Pat. No. 10,387,951, which is a continuation-in-part of application No. 14/577,727, filed on Dec. 19, 2014, now abandoned.

(60) Provisional application No. 61/918,388, filed on Dec. 19, 2013.

(51) Int. Cl.
*G06Q 30/00* (2023.01)
*G06Q 10/087* (2023.01)

(52) U.S. Cl.
CPC .................. *G06Q 10/087* (2013.01)

(58) Field of Classification Search
CPC .................................................. G06Q 10/087
See application file for complete search history.

(56) References Cited

U.S. PATENT DOCUMENTS

| | | | | |
|---|---|---|---|---|
| 4,736,294 A * | 4/1988 | Gill | ........................ | G06Q 40/03 235/379 |
| 6,088,686 A * | 7/2000 | Walker | .................. | G06Q 20/10 235/383 |
| 7,542,922 B2 * | 6/2009 | Bennett | .............. | G06Q 30/0601 235/383 |
| 10,163,156 B1 * | 12/2018 | Shapley | .................. | G06Q 40/03 |
| 10,332,208 B1 * | 6/2019 | Loo | ......................... | G06Q 40/08 |
| 2002/0116328 A1 * | 8/2002 | Bird | ........................ | G06Q 40/03 705/38 |

(Continued)

OTHER PUBLICATIONS

Westermann, Peter, and Frank Gahse. "Excellence in Vehicle Financing." Business Process Automation. Springer, Berlin, Heidelberg, 2004. 83-106.*

*Primary Examiner* — Kathleen Palavecino
(74) *Attorney, Agent, or Firm* — Smart & Biggar LP

(57) ABSTRACT

Processing of vehicle inventory information is described that allows vehicles that satisfy financial institution's financing requirements, as well as a purchaser's requirements are described. The inventory information is processed to determining eligible vehicles that meet the purchaser's requirements. The financial requirements are determined from financial booking information that describes how a financial institution determines the financing for vehicles providing a list of vehicles which can be financed by a financial institution while meeting the purchaser's requirements including the purchasers credit worthiness.

20 Claims, 8 Drawing Sheets

(56) References Cited

U.S. PATENT DOCUMENTS

| | | | | |
|---|---|---|---|---|
| 2004/0133479 | A1* | 7/2004 | Grove | G06Q 40/06 |
| | | | | 705/26.3 |
| 2006/0143112 | A1* | 6/2006 | Donarski | G06Q 40/02 |
| | | | | 705/38 |
| 2006/0218084 | A1* | 9/2006 | Krautter | G06Q 40/00 |
| | | | | 705/39 |
| 2007/0011083 | A1* | 1/2007 | Bird | G06Q 40/03 |
| | | | | 705/38 |
| 2008/0071677 | A1* | 3/2008 | Williams | G06Q 40/03 |
| | | | | 705/38 |
| 2008/0300988 | A1* | 12/2008 | Hoang | G06Q 30/0267 |
| | | | | 705/14.62 |
| 2009/0144188 | A1* | 6/2009 | Colabucci | G06Q 40/03 |
| | | | | 705/38 |
| 2009/0313121 | A1* | 12/2009 | Post | G06Q 30/0255 |
| | | | | 705/14.53 |
| 2015/0206234 | A1* | 7/2015 | Forrester | G06Q 40/03 |
| | | | | 705/38 |

* cited by examiner

Vehicle Locator

← → C  http:\\CarLocator.Example.com\

Account | Search | Reports  — 338

Approved Monthly Payment: 625
Credit Worthiness Group: 4  — 306
Desired Vehicle Class: Truck  — 308

Desired Monthly Payment: Min 525  Max 575 — 310, 316
Down Payment: 0 — 304, 312
Province: Ont — 314

Trade-In: 7500 — 318
Vehicle Lien: 11000 — 320

302

SEARCH > — 322

| [SEL] | Condition | Dealer | Year | Make | Model | Vehicle Trim | Bi-Weekly | Monthly | Price |
|---|---|---|---|---|---|---|---|---|---|
| [ ] | Clean  Stock #: 12-514-134 | AutoDealer Main Location  Ext. Color: White  Engine: 4.4L | 2012 | Chevrolet | Silvarado 1500 VIN: 1GRCAERC4Cz562193 | V8/2 WD/Ext. Cab/6.5 ft Bed  Mileage: 65,862 | $259 | $562 | $19,900 |
| [ ] | Extra Clean  Stock #: 445-58a5 | AutoDealer South Location  Ext. Color: White  Engine: 4.8L | 2012 | GMC | Sierra 1500  VIN: 4RGCEERC4Dz465126 | WT/Crew Cab  Mileage: 48,051 | $259 | $561 | $21,900 |
| [ ] | Extra Clean  Stock #: 5291R2 | Car Trader  Ext. Color: Dark Blue  Engine: 4.8L | 2011 | Chevrolet | Silvarado 1500  VIN: 1CAIEDGH3Cz143585 | LS  Mileage: 34,449 | $258 | $559 | $19,800 |
| [ ] | Extra Clean  Stock #: 685sd-8 | Find-A-Car  Ext. Color: Beige  Engine: 2.9L | 2009 | GMC | Canyon  VIN: 3OPLFRCC4zD758446 | SLE/Tow Package/4x4  Mileage: 79,034 | $253 | $548 | $18,800 |

324 — 326 — 328 — 330

Save Selected — 332    Create Report — 334    Email Selected — 336

Figure 3

SYSTEM AND METHOD FOR IDENTIFYING VEHICLES FOR A PURCHASER FROM VEHICLE INVENTORIES

CROSS-REFERENCE TO RELATED APPLICATIONS

This application is a continuation-in-part of U.S. patent application Ser. No. 16/544,353 which is a continuation-in-part of U.S. patent application Ser. No. 14/577,727 and U.S. patent application Ser. No. 15/852,938 which claim priority from U.S. Provisional Application No. 61/918,388 filed Dec. 19, 2013 the entireties of which are hereby incorporated by reference for all purposes.

TECHNICAL FIELD

The current disclosure is directed to vehicle purchasing utilizing a vehicle inventory systems, and in particular to facilitating identification vehicles in the vehicle inventor systems for a purchaser.

BACKGROUND

When looking for a vehicle, a purchaser will typically be approved for a particular purchase amount or may have a desired monthly payment range for the vehicle. When trying to find a vehicle, they typically find one or more vehicles that may be in the price range of the desired monthly payment. Once a desired vehicle is located, the vehicle and price information is processed to determine if the vehicle meets booking requirements for the financial institution offering the loan for the vehicle for the purchaser.

While traditional approach as described above determines if a particular purchaser can afford a particular vehicle, it is cumbersome to use since each potential vehicle needs to be first selected and then checked to see if the purchaser can afford it. In addition each financial institution may have different lending rates and requirements increasing the complexity of the search process. The process of finding an appropriate vehicle can be time consuming and inefficient and not provide satisfactory results in identifying an appropriate vehicle for the purchaser. It would be desirable to have an additional, alternative and/or improved process for identifying affordable vehicles for a purchaser from an inventory of vehicles.

BRIEF DESCRIPTION OF THE DRAWINGS

Embodiments will be described further herein with reference to the drawings, in which:

FIG. 3 depicts data structures used in identifying vehicles;

It should be noted that throughout the appended drawings, like features are identified by like reference numerals.

DETAILED DESCRIPTION

Figure 1:
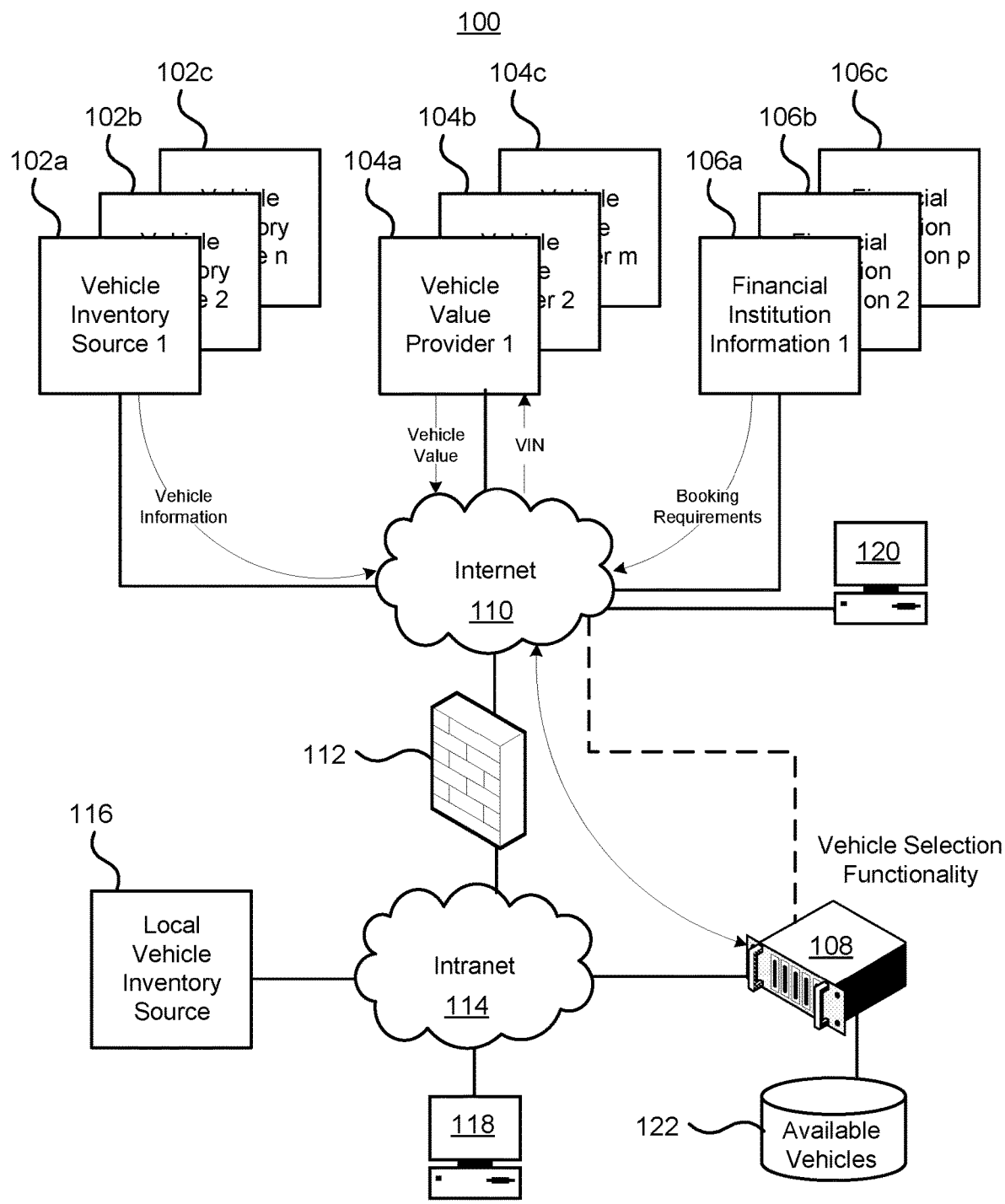
FIG. 1 depicts a system for identifying vehicles for a purchaser.

Embodiments are described below, by way of example only, with reference to FIGS. 1-8.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for determining eligible vehicles for a purchaser. The method also includes receiving purchaser financing information associated with a purchaser of a vehicle; receiving a vehicle indicator associated with the purchaser defining at least one vehicle value, determining credit conditions associated with the purchaser financing information from a financial institution including a credit worthiness score, searching a vehicle inventory source identifying a plurality of available vehicles and associated vehicle inventory information using the vehicle indicator and a total amount to finance (TATF) from the credit conditions and a determined value of a respective vehicle in the vehicle inventory information, and returning a subset of eligible vehicles determined from the vehicle inventory source complying with financing booking requirements for the financial institution to a computing device of the purchaser for display thereon. Other embodiments of this aspect include corresponding computer systems, apparatus, and computer programs recorded on one or more computer storage devices, each configured to perform the actions of the methods.

When purchasing a new or used vehicle, a purchaser typically needs to finance at least a portion of the purchase. That is, the purchaser may require a loan from a financial institution to complete the purchase. The vehicle may be for example an automobile, recreational vehicles, all-terrain vehicles, snowmobiles, personal watercraft, boats, trailers, motorcycles, scooters, e-bikes and any other vehicle to which financing applies. In purchasing a vehicle, there are a number of financial considerations, including whether the purchaser can afford, or have been approved for, the loan amount, and if the financial institution will loan the required amount for the particular vehicle. Accordingly, selecting a vehicle that meets the purchaser's requirements, meets the purchaser's financial situation, and meets a financial institution's requirements may require various trial and error. Typically, a purchaser selects a car that matches their requirements or desires, such as the make, model, color, trim, mileage, year etc., and then it is determined if the purchaser can afford the vehicle and if the financial institution will loan the required amount to the purchaser. The actual price of a selected vehicle will depend upon an amount to be financed, the interest rate for the loan, which can depend upon vehicle information as well as purchaser information, and a loan term that may depend upon the vehicle being purchased. If the purchaser cannot afford the vehicle, or the financial institution will not loan the required amount to the purchaser, the selection process must be started over, requiring the purchaser to select another possible vehicle. In determining whether the financial institution will loan the required amount, the vehicle information may be input into a program or portal of the financial institution that will provide an indication of the acceptance or rejection of the vehicle loan.

As described further herein, it may be possible to maintain information of available vehicles for purchase and information on financial institutions. The vehicle information may be processed in order to identify vehicles that the purchaser can afford. Accordingly, it is possible to determine a list of potential vehicles that meet the requirements of both the purchaser and the financial institution.

A financial institution may agree to loan a purchaser a certain amount to purchase a vehicle. The total amount the financial institution may be willing to lend a purchaser may be based on a determined credit worthiness of the purchaser. The customer credit profile or "Credit Worthiness" is determined by the lending/financial institution based on the applicants/customers credit history outlined in which ever credit bureau the financial institution uses (Equifax™, TransUnion™, FICO™ . . . etc) to adjudicate their credit and determine what the approval condition outcome will be (what programs they qualify for). This is not just limited to the credit bureaus but can also be determined based on Age, Ethnicity, Gender, Education, job description etc. if the person has no or very limited credit on their credit profile. Also, the terms and conditions of the loan may be determined at least in part on the credit worthiness of the purchaser. The actual amount a financial institution will lend to the purchaser may be less than the total amount the financial institution is willing to lend. The actual amount may be based on a determined value of the particular vehicle to be purchased. For example, a financial institution may approve a purchaser for a $20,000.00 loan to purchase a vehicle. However, the financial institution will not provide the total loan amount in order to purchase a vehicle that has a determined value of $5,000.00. Further, the terms and conditions that determine the actual cost of the loan, for example the interest rate, may be based on both the credit worthiness of the purchaser as well as details of the particular vehicle being purchased, such as a model year of the vehicle. The systems, methods and apparatuses described further herein determines the vehicles that satisfy the various criteria of both the financial institution and the purchaser. The potential vehicles, which have been determined to meet the financial institution's and the purchaser's requirements may be presented to the purchaser, which simplifies the vehicle purchase process by eliminating from consideration those vehicles that either do not suit the purchaser or which do not meet the financial institution's requirements for providing the loan.

FIG. 1 depicts a system for identifying vehicles for a purchaser. The system 100 comprises a number of interacting computing devices. Broadly, the system includes one or more sources of vehicle inventory information, one or more sources for determining a value of a vehicle, one or more sources for financing information and a computing device implementing vehicle selection functionality that retrieves, processes and combines information from the various sources in order to present one or more eligible vehicles that meet selection criteria for both the purchaser and financing institution.

The vehicle selection functionality may be provided by a computing device, such as a server, connected to a network. As depicted, the vehicle selection functionality server 108 may be connected directly or indirectly to the Internet 110. The vehicle selection functionality server 108 may be connected to an intranet 114 or other network, which in turn may access the Internet 110 through one or more network appliances, such as a firewall 112. The vehicle selection functionality may be provided as a service available to multiple companies, businesses or services for selling vehicles. For example, a car dealership may provide the vehicle selection functionality to its employees and customers. In such a scenario, the vehicle selection functionality server 108 may be hosted on an internal network, or intranet 114, of the dealership. The vehicle selection functionality server 108 may retrieve information regarding vehicle inventory containing current vehicles for sale, from a local source 116 available on the dealership's intranet 114. For example, the dealership may track the available vehicle inventory in a database, spreadsheet, tabular or other data structure that can be accessed by the vehicle selection functionality server 108. One or more client computers 118 connected to the intranet 114 can be used to interact with the vehicle selection functionality server 108 and determine eligible vehicles for a purchaser. Additionally or alternatively, one or more client computers 120 connected to the Internet, either directly or indirectly, may be used to interact with the vehicle selection functionality server 108 and determine eligible vehicles for a purchaser.

In addition to, or as an alternative to, providing the vehicle selection functionality to a single dealership location, the functionality may be provided to multiple dealership locations. For example, a dealership, or dealer network may have multiple locations. The vehicle selection functionality server may receive vehicle inventory information for the different locations. Accordingly, the vehicle selection functionality may determine eligible vehicles from a larger pool of vehicle inventory.

Further still, the vehicle selection functionality may be provided as a service to one or more dealerships, or one or more sources of vehicles for sale in order to facilitate a purchaser identifying vehicles they are eligible to purchase.

The vehicle selection functionality server 108 may access one or more sources of vehicle inventory. The vehicle inventory sources may be located locally on the same network the vehicle functionality server 108 is connected to, or may be located externally on one or more communicatively coupled networks. For example, FIG. 1 depicts vehicle inventory sources 102a, 102b . . . 102n as being communicatively coupled to the vehicle selection functionality server 108. The vehicle inventory sources 102a, 102b, . . . 102n may include inventory sources from one or more dealerships, one or more locations of dealerships, vehicle selling collections such as AutoTrader®, and/or vehicle classifieds. Additionally, or alternatively, the vehicle selection functionality server 108 may maintain vehicle inventory information, for example retrieved from one or more of the vehicle inventory sources 116, 102a, 102b, 102n, or input directly from one or more client computers 120, 118. The vehicle selection functionality server 108 may aggregate vehicle information of vehicles available for purchase into a local repository such as database 122 of available vehicles. The vehicle selection functionality server 108 may periodically, such as hourly, daily, etc., update the repository 122 of available vehicles in order to remove vehicles that have been sold and add any new vehicles for sale.

Regardless of how the vehicle inventory sources are provided, each provides information on a vehicle that is for sale. The vehicle information includes a unique Vehicle Identification Number (VIN) that can be used to uniquely identify the vehicle for sale. The vehicle information may further include other vehicle information such as the make, model, year, trim level, color, and other options or extras. The vehicle information may further include information such as the vehicle condition and mileage. The vehicle information may further include the purchase price of the vehicle. Certain vehicle information, such as the make, model, year trim level, color, and other options or extras may be associated with the VIN through one or more vehicle information sources, separate from the vehicle inventory source. Accordingly, the vehicle information may be aggregated from multiple information sources.

In order to determine if a purchaser is eligible to purchase a particular vehicle, the vehicle selection functionality determines if the purchaser will be able to finance the required amount from a financial institution. As described further below, financial institutions determine an amount they are able to loan to a purchaser based in part on an estimated value of the vehicle, which may not be the same as the purchase price of the vehicle. Accordingly, the vehicle selection functionality server 108 may be communicatively coupled to one or more computing devices or storage devices that provide a value for a particular vehicle from vehicle value providers 104a, 104b, 104n. The vehicle value providers 104a, 104b, 104n may provide a network accessible service that receives a VIN, and possibly other information such as the mileage and/or condition and provides a value of the vehicle. If no mileage and/or condition is provided, a number of values, or ranges of values, may be provided for different mileages and/or conditions. The vehicle value providers 104a, 104b, 104n may include for example one or more of: Black Book™, Blue Book™, Gold Book™, VMR Canada™, NADA Guides™ or other sources for providing estimated values of vehicles.

In determining if a vehicle is eligible for a purchaser, the vehicle selection criteria server 108 determines if a financial institution will loan the purchaser the required amount to purchase the vehicle. In order to determine if the vehicle is eligible, the vehicle selection functionality utilizes financial institution information 106a, 106b, 106n for one or more financial institutions that provides the booking requirements and other financial information. For example, the total amount to finance (TATF), or the vehicle purchase price, may be set by financial institutions based as a percentage of the vehicle value. For example, a financial institution may be willing to loan up to 140% of the vehicle value to a purchaser. Further, the TATF may also be based on a credit worthiness of the purchaser. For example, a first purchaser with relatively good credit may be loaned up to 140% while a second purchaser with relatively poor credit may only be loaned up to 120% of the vehicle value. The booking requirements may also provide information on interest rates available. For example, the interest rate offered on the loan may change depending upon the model year of the vehicle being purchased. Further, the interest rate offered may also vary based on the creditworthiness of the purchaser. The booking requirements may also comprise information on the maximum term of the loan. The maximum term of the loan may vary based on the model tear of the vehicle, the mileage of the vehicle and/or the condition of the vehicle.

The booking requirements may be provided as one or more tables or data structures that specify the various information. Each financial institution provides equivalent information, although the specific values and/or names may vary. Illustrative tables for a single financial institution specifying the financial booking requirements are depicted below.

TABLE 1

Table of interest rates based on creditworthiness and vehicle model year

| Model Year | Credit Group 1 | Credit Group 2 | Credit Group 3 | Credit Group 4 |
|---|---|---|---|---|
| 2013-2014 | 10.9% | 14.5% | 19.5% | 23.5% |
| 2012 | 13.9% | 16.5% | 20.5% | 24.5% |
| 2011 | 13.9% | 16.5% | 21.5% | 25.5% |
| 2010 | 14.9% | 17.5% | 22.5% | 26.5 |
| 2009 | 14.9% | 17.5% | 23.5% | 27.5% |
| 2008 | 15.9% | 18.5% | 24.5% | 28.5% |

TABLE 2

Table of maximum monthly payments and used car advance based on creditworthiness

| | Credit Group 1 | Credit Group 2 | Credit Group 3 | Credit Group 4 |
|---|---|---|---|---|
| Maximum Monthly Payment | $700.00 | $700.00 | $600.00 | $500.00 |
| Used Car Advance Based on Vehicle Value | 140% | 140% | 130% | 120% |
| Backend Advances | 40% | 40% | 40% | 40% |

TABLE 3

Table showing maximum allowable terms based on year and condition/mileage of vehicle

| Year | Max Term | Extra Clean | Max Term | Clean | Max Term | Average | Max Term | Rough |
|---|---|---|---|---|---|---|---|---|
| 2013 Used | 84 | 5,001-25,000 | 84 | 25,001-50,000 | 72 | 50,001-80,000 | 66 | 80,001-100,000 |
| 2012 | 84 | 0-50,000 | 72 | 50,001-80,000 | 66 | 80,004-120,00 | 60 | 120,001-180,000 |
| 2011 | 72 | 0-60,000 | 72 | 60,001-96,000 | 66 | 96,001-140,000 | 60 | 140,001-180,000 |
| 2010 | 72 | 0-72,000 | 72 | 72,001-96,000 | 66 | 96,001-140,000 | 54 | 140,001-180,000 |
| 2009 | 72 | 0-84,000 | 72 | 84,001-125,000 | 60 | 125,001-160,000 | 48 | 160,001-180,00 |
| 2008 | 68 | 0-90,000 | 66 | 90,001-130,000 | 60 | 130,001-160,000 | 48 | 160,001-180,000 |
| 2007 | 60 | 0-100,000 | 60 | 100,001-130,000 | 54 | 130,001-160,000 | 48 | 160,001-180,000 |
| 2006 | | No Book Value | 48 | 0-140,000 | 48 | 140,001-160,000 | 42 | 160,001-180,000 |
| 2005 | | No Book Value | 36 | 0-140,000 | 36 | 140,001-160,000 | 36 | 160,001-180,000 |
| 2004 | | No Book Value | 24 | 0-140,000 | 24 | 140,001-160,000 | 24 | 160,001-180,000 |
| 2003 | | No Book Value | 12 | 0-140,000 | 12 | 140,001-160,000 | 12 | 160,001-180,000 |

In determining if a vehicle is eligible to be purchased by a purchaser, the vehicle selection functionality determines the value of the vehicle from at least one of the value providers 104a, 104b, 104c using the vehicle information associated with the VIN. The vehicle value is used to determine the total amount to finance (TATF), which may include both the vehicle purchase price, including any additional options, services or packages, referred to as frontend allowances and any warranties, insurance or other options, referred to as backend allowances. The TATF may also include applicable taxes. From the table 2 above, assuming a vehicle value of $10,000 the financial institution will provide a loan to a purchaser, with a credit rating that places them in the Group 1 of credit, in the amount of $18,000 plus taxes. This total amount is determined as the 140% allowance for the frontend vehicle cost as well as the 40% allowance for the backend vehicle cost.

Once the allowable TATF is determined for the vehicle and purchaser, the vehicle selection functionality server 102 determines the actual vehicle costs based on the purchase price of the vehicle, the interest rate, and loan term as determined from the booking requirements of the financial institution, the particular vehicle information and creditworthiness of the purchaser. Assuming the vehicle is a 2010, the interest rate for the purchaser is 14.9%, since the purchaser is in the Credit Group 1. Further, assuming the vehicle has 155,000 km, or is classified as in 'Rough' condition, the maximum term for the loan will be 54 months. The total amount to finance may then be determined based on the above information. Although not described above, the total amount to finance may take into account any trade-in value, outstanding liens on the traded-in vehicle and down payment. Further, in determining a TATF, an assumed amount of backend costs may be specified. For example, when determining eligible vehicles, it may be possible to specify to include a backend cost. The backend cost may be specified as a fixed dollar amount ranging from $0.00 to a maximum amount, or may be specified as a percentage ranging from 0.00% to a maximum percentage, which may be the backend allowance provided by the financial institution, for example 40%.

Once the payment information is calculated, the required recurring payments, for example monthly payments, will be known. The vehicle selection functionality may compare the required monthly payments to the maximum allowable monthly payments specified by the financial institution, as well as a preferred monthly payment amount for the purchaser. If the vehicle meets the selection criteria, that is it meets the financial institution's booking requirements for loaning the money and the purchaser's requirements for purchasing the car, for example the price, color make, model, type of vehicle etc, the vehicle may be marked as an eligible vehicle for the purchaser. The vehicle selection criteria may process the entire data store of available inventory in order to identify all vehicles meeting the selection criteria. That is, the vehicle selection functionality will identify all available vehicles that the purchaser is interested in, and that the purchaser can afford by receiving financing from one of the financial institutions.

Once the eligible vehicles have been determined, they may be returned for presentation. The eligible vehicles may be presented to the purchaser, an agent for the purchaser, a sales associate or other person looking into vehicles. The eligible vehicles may be presented in a web page, an application, mobile app, in an email, or other type of electronic communication.

Figure 2:
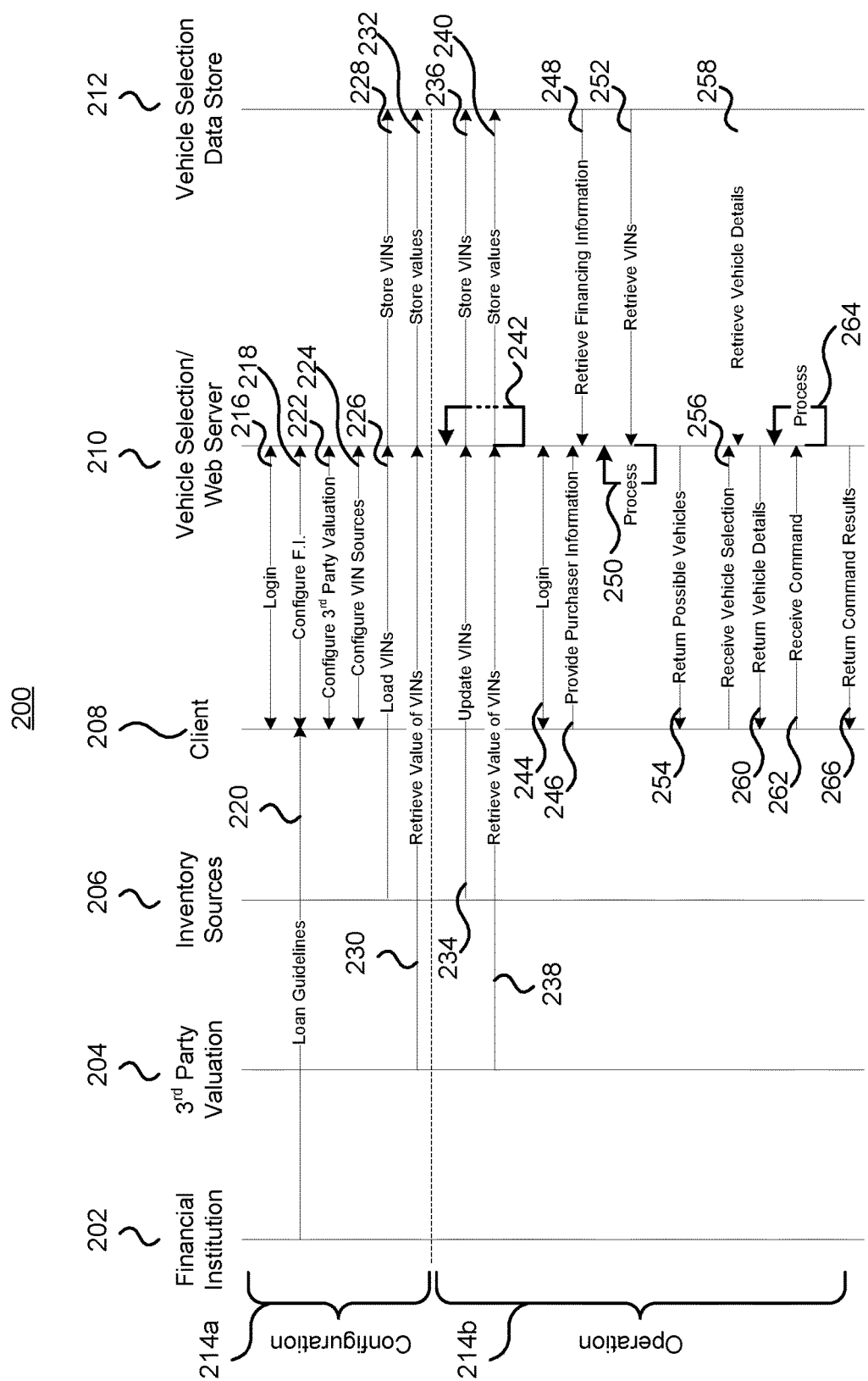
FIG. 2 depicts a process for identifying vehicles.

FIG. 2 depicts a process for identifying vehicles. The process 200 depicted in FIG. 200 depicts illustrative interactions between various components of a system. The process may be carried out by a system such as that described above with regard to FIG. 1. For example, the financial institution 202 may be the financial institution providing the financial institution information 106a, 106b, 106n. The $3^{rd}$ party valuation 204 may be provided by one or more of the vehicle value providers 104a, 104b, 104n. The inventory sources 206 may be provided by one or more of the vehicle inventory sources 102a, 102b, 102n, 116. The client 208 may be provided by one or more computing devices such as computers 118, 120. The vehicle selection/web server 210 may be provided by the vehicle selection functionality server 108. The vehicle selection data store 212 may be provided by the data repository 122. As depicted in FIG. 2, the process 200 comprises two portions 214a, 214b. The first portion 214a involves configuring the vehicle selection/web server 210. The configuration 214a sets the various configurations, settings, variables, and parameters for the operation of the vehicle selection/web server 210. The configuration process 214a may be performed once when the vehicle selection/web server is initially configured. Additionally, the configuration process 214a, or parts thereof may be periodically performed, for example to change operating parameters, add and/or remove users or other configuration settings and perform other maintenance such as upgrading or updating components of the vehicle selection/web server 210.

The other portion 214b of the process 200 is the normal operation of the vehicle selection/web server 210. During normal operation, the vehicle selection/web server may periodically, for example, hourly or daily, update vehicle information as process any requests or commands for identifying vehicles for a purchaser.

Turning to the configuration portion 214a of the process, a user, such as an administrator of the vehicle selection/web server 210, uses a client 208 to log into the vehicle selection/web server (216). The login may authenticate and authorize a user name/password of the user to verify that the user is authorized to configure the vehicle selection/web server 210. Once the user is logged in, the vehicle selection/web server 210 may present the user with a user interface for configuring the system. The user may configure the financial institution information (218). If the financial institutions provide network based access to their loan guidelines, the configuration may include configuring such access, including providing locations for retrieving the loan guidelines, or financial institution's loan booking requirements as well as credentials for logging into the service. If one or more of the financial institutions provide network based access, the loan guidelines can be retrieved (220). If the financial institutions do not provide network based access to their loan guidelines, the configuration may include inputting the loan guidelines from the client 208. Once the loan guidelines are received, they can be stored for subsequent use by the vehicle selection/web server 210. Although not depicted in FIG. 2 for simplicity, the loan guidelines, or financial institution's booking requirements for each financial institution may be stored in the vehicle selection data store 212, or may be stored in other storage accessible by the vehicle selection/web server 210.

In addition to configuring the financial institution information, the configuration process 214a may also configure the $3^{rd}$ party valuation sources (222). The configuration of the $3^{rd}$ party valuation sources may include specifying one or more valuation services to use, uniform resource indicators (URIs) where the valuation services are accessed as well as credentials, if required, for accessing the $3^{rd}$ party valuation services. Again, although not depicted in FIG. 2, the configuration of the $3^{rd}$ party valuation services may be stored in the vehicle selection data store 212, or may be stored in other storage accessible by the vehicle selection/web server 210.

The configuration process 214a also includes the configuration of inventory sources 206. Configuring the inventory sources (224) may include specifying one or more inventory sources to use, uniform resource indicators (URIs) where the inventory information is accessed from, as well as credentials, if required, for accessing the inventory information. Again, although not depicted in FIG. 2, the configuration of the inventory sources may be stored in the vehicle selection data store 212, or may be stored in other storage accessible by the vehicle selection/web server 210. Once one or more inventory sources have been configured (224), the vehicle information is loaded from the inventory sources (226) and stored to the vehicle selection data store (228). The configuration 214a may also include retrieving the value, values or range of values, for each of the available vehicles (230) using the configured $3^{rd}$ party valuation services 204 and store the values in the vehicle selection data store (232).

Turning to the operation portion 214b of the process 200, the vehicle selection/web server 210 periodically updates the available vehicles for purchase from the configured inventory sources (234), and stores the updated inventory information to the data store (236). The values of updated vehicles may be retrieved (238) and stored (240) in the data store 212. The available vehicle inventory and values may be updated periodically in a batch type process in order to remove all vehicles that are no longer available, as well as to add newly available vehicles. Additionally or alternatively, the available vehicle inventory information may be updated by receiving at the vehicle selection/web server an indication of one or more available vehicles that have been sold, or an indication of one or more vehicles to be added. Regardless of how the vehicle inventory information is updated, it is repeatedly updated (242) in order to maintain the available vehicles information up to date. The updates may be schedules to be performed at times of low use of the vehicle selection/web server, such as overnight.

In addition to maintaining the available vehicle information up to date, the operation portion 214b also allows a user to interact with the vehicle selection/web server 210 in order to identify one or more eligible vehicles for a purchaser. The user may be, for example a purchaser of the vehicle, an agent for the purchaser, a sales associate of dealership or other person interested in identifying a vehicle. The user may login (244) to the vehicle selection/web server 210. The login may require authentication and/or authorization of the user. Alternatively, the vehicle selection/web server 210 may be accessible without requiring authorization and/or authentication. Regardless of if authentication/authorization is required, once logged in, the vehicle selection/web server 210 provides a user interface, for example a web page, to the client 208 of the user. The user interface allows the user to provide purchaser information (246) to the vehicle selection/web server 210. The purchaser information may specify a credit worthiness of the purchaser, an approved monthly payment for which the purchaser has been approved by a financial institution, a desired monthly payment range, desired vehicle information, a down payment amount, an existing vehicle trade-in value, and an existing vehicle lien amount. The purchaser information is used to retrieve relevant financing information (248), which is used in processing the available vehicles (250) to identify eligible vehicles for the purchaser. The vehicle selection/web server 210 processes (250) each of the available vehicles (252) stored in the data store. The processing includes determining if the vehicle meets selection criteria, including booking requirements of the financial institution and the purchaser requirements. Each vehicle that meets the selection criteria may be marked as an eligible vehicle. Alternatively, each vehicle that meets the booking requirements of the financial institutions may be marked as an eligible vehicle and the purchaser requirements may be used to filter the eligible vehicles. Once the vehicles have been processed, the eligible vehicles may be returned to the client (254). The client may present a user interface to the user that displays the eligible vehicles and allows the user to select one or more of the vehicles, for example to display details of the vehicle. The vehicle selection/web server 210 may receive a vehicle selection (256) from the client and may retrieve the details of the selected vehicle (258) and return them to the client (260) for presentation. The user interface presented to the user on the client may allow other functionality to be performed, for example, selecting one or more of the vehicles, changing a display order of the eligible vehicles, removing vehicles from the list of eligible vehicles, printing a list of eligible vehicles and/or emailing a list of eligible vehicles. The user interface can provide a command, which is received at the vehicle selection/web server (262), processed (264) and the results returned to the client (266).

FIG. 3 depicts an illustrative display for identifying vehicles for a purchaser. The display is depicted as a web page 300 presented within a web browser. It will be appreciated that other user interfaces are possible, such as a mobile application, or desktop application. The web page 300 allows purchaser information to be input and provided to the vehicle selection/web server 210 described above and the determined eligible vehicles to be presented. The interface includes a portion 302 for entering the purchaser information. The portion 302 may include an element 304 for specifying an approved month payment amount. This amount may be an amount the purchaser has already been approved for by a financial institution. Alternatively, this amount may be determined from the financial booking requirements, which specifies a maximum monthly payment amount based on a credit group for the creditworthiness of the purchaser. The interface may further provide selection of financial institutions that purchaser may be approved by. The interface may also provide an element 306 for specifying creditworthiness of the purchaser. The element 306 may be provided as a drop-down menu displaying the available credit groupings of one or more financial institutions. The interface may also include an element 308 to allow a user to specify vehicle preferences of the purchaser, such as the vehicle class. Although depicted as only specifying the class of the vehicle, the user interface may also specify other desired characteristics, including make, model, year, mileage, condition, options, color etc.

The interface may also include elements 310, 316 for specifying a desired minimum monthly payment and maximum monthly payment of the purchaser. The interface may further include an element 312 for specifying a down payment amount, an element 318 for specifying a value of a trade-in vehicle, and an element 320 for specifying a value of an outstanding amount of a lien on the vehicle being traded in. Additionally, the interface may further include an element 314 for specifying a geographic location in which the vehicle should be located. A search button or other element 322 may be included in order to initiate the search for identifying eligible vehicles based on the specified purchaser financing information.

Once the search for eligible vehicles has been performed by the vehicle selection/web server 210, the results may be returned and presented. As depicted, the results 324, 326, 328, 330 may be presented as a table of vehicle information. Each of the results 324, 326, 328, 330 may specify vehicle information for each of the eligible vehicles. The results may be arranged by different columns of the table.

A number of the results may be selected and an action performed on the selected results. For example, a list of selected results may be saved 332, or a report generated 334, or the selected results may be emailed to the purchaser 336. When emailing the results to the purchaser, the actual results may be included in the email, or a reference to the results stored at the vehicle selection/web server may be provided.

The above interface 300 is illustrative only. Various interfaces for specifying purchaser information and displaying results of eligible vehicles are possible. Elements within the interface may be positioned at different location and additional fields may be provided for receiving input from the user.

Figure 4:
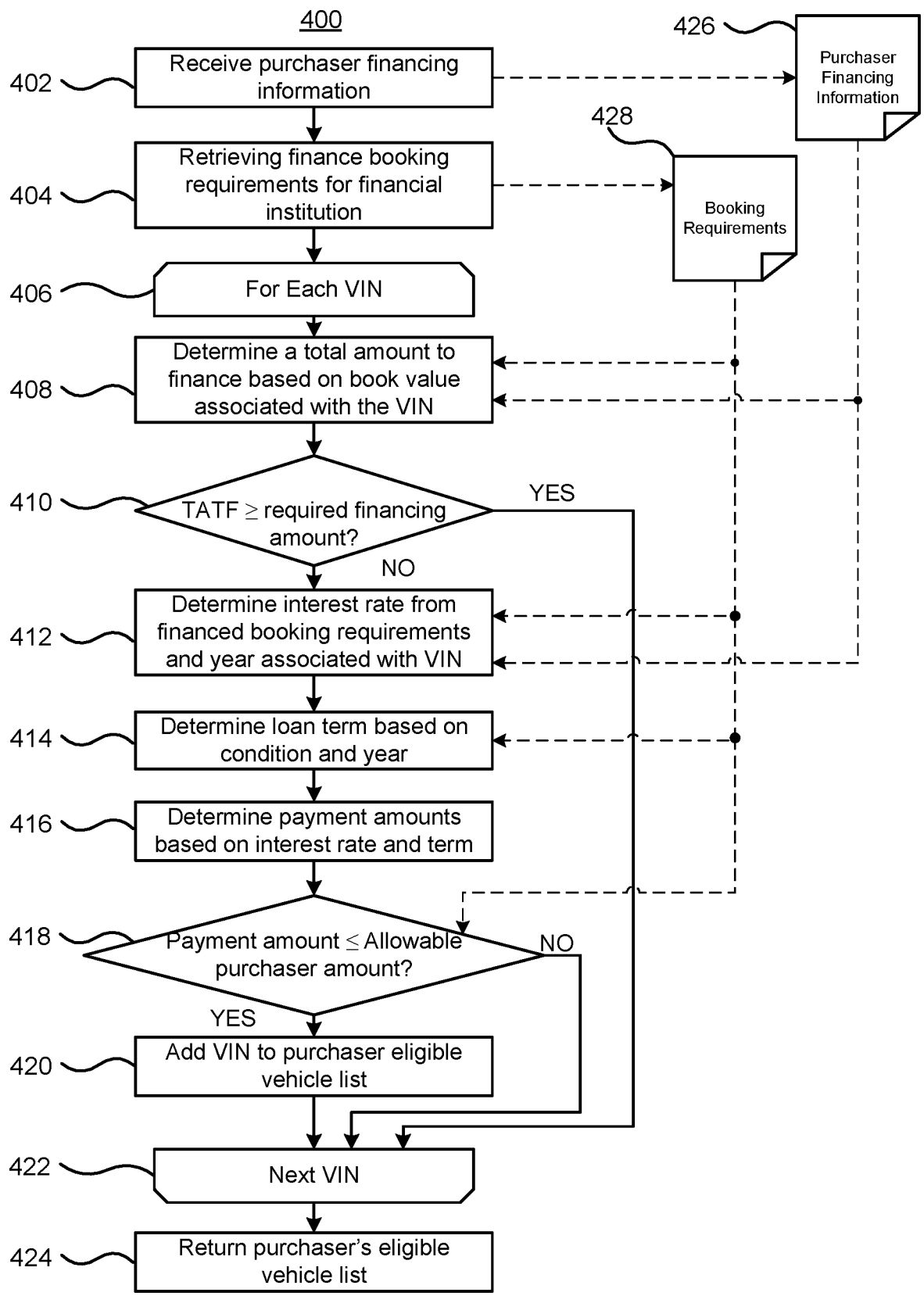
FIG. 4 depicts a method for identifying vehicles for a purchaser.

FIG. 4 depicts a method for identifying vehicles for a purchaser. The method may be used in identifying eligible vehicles for a purchaser from a pool of available vehicles. The method 400 may be implemented in the system 100 described above, and in particular in the vehicle selection functionality server 108 or vehicle selection/web server 212.

The method 400 receives purchaser financing information (402). The received purchaser financing information 426 is used in determining eligible vehicles for the purchaser. The purchaser financing information 426 includes an indication of a creditworthiness of the purchaser. The creditworthiness of the purchaser may be expressed as one of a plurality of credit groupings a financial institution uses.

Additionally or alternatively, the creditworthiness may be expressed as one or more financial attributes that can be used to determine which of the one or more credit groupings of the financial institutions the purchaser falls in. The credit groupings of the financial institutions may be expressed in various ways, such as credit rating stars, keys or other groupings. The purchaser financing information 426 may include additional information including approved loan amounts, including an approved total amount and/or an approved monthly payment amount. Alternatively, this information may be determined based on the financial institution's booking requirements and the creditworthiness of the purchaser. The purchaser financing information may include desired financing information of the purchaser, such as a desired monthly payment range. The purchaser financing information may also include, for example desired vehicle information such as vehicle type, make, model, year, color, location etc. The desired purchaser information, such as desired monthly payments or desired vehicle characteristics may be used to filter eligible vehicles. Alternatively, if there are no results, or less than a results threshold, after filtering the eligible vehicles using the desired purchaser information, the desired information may be ignored or adjusted in order to provide more results of eligible vehicles.

Once the purchaser financing information is received, finance booking requirements for one or more financial institutions is retrieved (404). The finance booking requirements 428 may provides the information on determining the total amount to finance (TATF), the interest rates, and loan term, as well as any additional conditions a financing institution may require. The booking requirements may be specified as one or more tables, such as Tables 1-3, or other data structures that specify the required information.

Once the finance booking requirements for one or more financial institutions is retrieved, each vehicle, or VIN, of the available vehicles is processed (406). The processing of each VIN determines a total amount to finance based on a vehicle value associated with the VIN (408). The vehicle value may be stored in a data store and periodically updated from one or more vehicle value providers. Additionally or alternatively, the vehicle value may be retrieved from one or more $3^{rd}$ party vehicle value providers. The TATF may determined as a percentage of the vehicle value. The particular percentage may be dependent upon the financial institution providing the financing. Further, each financial institution may provide a different percentage based on the credit worthiness of the purchaser. For example, as depicted above in Table 2, a financial institution may advance up to 140% of the vehicles value for the frontend cost of the vehicle for purchaser having creditworthiness in the Credit Group 1. The method 400 may perform a check to determine if the TATF is greater than or equal to the required financing amount (410). The required financing amount may be the use amount of money required by the purchaser to be financed. The required financing amount may be determined from the purchase price of the vehicle, any down payments provided by the purchaser, any trade-in values and any outstanding liens on the vehicles being traded in. If the TATF that is the amount of money the financial institution is willing to loan to the purchaser based on the vehicle value is less than the amount of money required by the purchaser to buy the vehicle (No at 410), the vehicle is too expensive for the purchaser and the next vehicle or VIN is processed (422). If however the TATF is greater than or equal to the required financing amount (Yes at 410), the method determines an interest rate for the loan (412). The interest rate may be determined from the finance booking requirements of the financial institution. As depicted in Table 1 described above, the interest rate may depend upon the creditworthiness of the purchaser and the model year of the vehicle. The method also determines a maximum loan term (414). The maximum loan term may be determined from the finance booking requirements of the financial institution. As depicted in Table 3 above, the maximum loan term may be determined based on the year of the vehicle and the condition and/or mileage of the vehicle. Alternatively, the maximum loan term may be provided by the user as a desired loan term. However, specifying the maximum loan term may result in a shorter loan term, and as such higher monthly payments, resulting in few eligible vehicles.

Once the interest rate and loan term are determined, the required monthly payments can be determined (416). The monthly payments may be determined based on the frontend value of the vehicle, a backend value of the vehicle, down payments, trade-ins and outstanding liens. As described above, financial institutions may allow a total amount to finance based on a value of the vehicle, as well as additional backend financing amount, which is also based on the value of the vehicle. For example, the backend financing amount may be 40% of the vehicle value. The total cost of the vehicle may be determined as:

$$Cost=Frontend+Backend+outstanding\ liens-trade\ in+taxes-down\ payment$$

Where:
  Frontend is the purchase price plus the cost of any extras minus any discounts;

Backend is the cost of any warranty and insurance or other products or services considered under the backend costs by the financial institution;

Outstanding liens is the value of any outstanding liens on trade-in vehicles;

Down payment is the down payment amount provided by the purchaser;

Trade in is the trade in value of any vehicles being trade in; and

Taxes is the amount of taxes required to be paid for the purchase.

Using the total cost, interest rate and loan term, the monthly payment amount is determined (416), and checked to determine if the monthly payment amount is less than the monthly payment amount allowed by the financial institution (418). The monthly payment amount allowed by the financial institution may be determined from the finance booking requirements and may be based on the creditworthiness of the purchaser. If the required monthly payment is greater than the allowable payment amount of the financial institution (No at 418), the vehicle is too expensive for the purchaser and the next vehicle or VIN is processed (422). If the required monthly payment is less than or equal to the allowable payment amount of the financial institution (Yes at 418), the vehicle is eligible for purchase by the purchaser and the VIN, and/or vehicle information, is added to a list of eligible vehicles for the purchaser (420) and the next VIN or vehicle processed (422). Although described as being added to a list of eligible vehicles, the eligible vehicles for a purchaser may be marked in other ways. Once all of the VINs have been processed, the eligible vehicles are returned.

The eligible vehicles may be presented to the user as described above. It may be possible to display vehicle details of one or more of the eligible vehicles. Further, it may be possible to display the financing details for one or more vehicles. When displaying the financing details, it may be possible to display additional amounts that are available to be added to both the frontend and backend, while still maintaining the affordability of the vehicle for the purchaser. The additional frontend amount may be determined as the additional amount of frontend value that can be added, up to the TATF determined based on the vehicle value, while still maintain the monthly payments within the allowable range. Similarly, the additional backend amount may be determined as the additional amount of backend value that can be added, to a maximum determined based on the vehicle value, for example up to a maximum of 40% of the vehicle value, while still maintain the monthly payments within the allowable range.

Although the above has described a method for identifying eligible vehicles, it may be possible to identify eligible vehicles in other ways. As described further below, the vehicle selection functionality may determine minimum vehicle values required to meet the amount to finance requirements based on provided purchaser information. A number of minimum vehicle values may be determined for given vehicle years and condition and/or mileage. The determined minimum vehicle values may be used to search available vehicle inventory to find units equal to or greater than that amount and then calculate the actual monthly and/or biweekly payments based on the financing institution's criteria.

Figure 5:
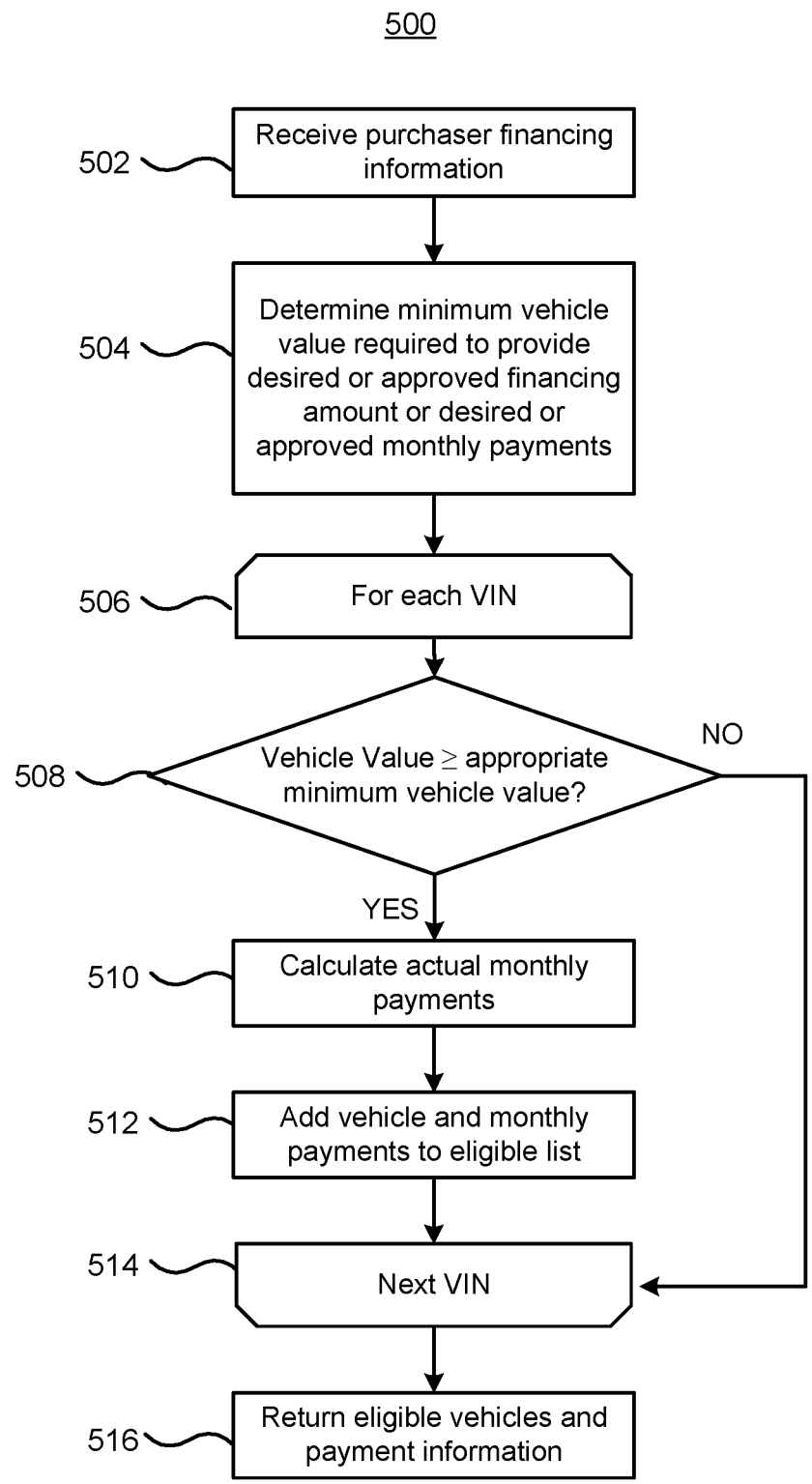
FIG. 5 depicts a method for identifying vehicles for a purchaser.

FIG. 5 depicts a further method for identifying vehicles for a purchaser. The method 500 is similar to that described above, however minimum vehicle value is determined and used to check to see if the vehicle meets the minimum vehicle value requirement. The minimum vehicle value may be determined based on a total amount to finance. For example, the total amount to finance may be 140% of the vehicle value. The total amount to finance may be specified or may be determined from an approved monthly payment amount, or a desired monthly payment amount.

For a particular desired monthly payment amount, the total amount to finance may depend upon the interest rate and term of the loan. As described above, the interest rate may depend upon the creditworthiness of the purchaser as well as a model year of the vehicle. The loan term may depend upon the model year and the condition and/or mileage of the vehicle. The vehicle information is not known until a particular vehicle is considered. Accordingly, if the payment amount is provided as a desired monthly payment, or approved monthly payment, a number of different minimum vehicle values may be determined for the different possible model years and vehicle condition.

The method 500 receives purchaser financing information, which may specify a creditworthiness of the purchaser as well as an approved or desired financing amount and/or monthly payment amount (502). A minimum vehicle value is determined (504) that will provide the financing amount based on the specified financing amount. Additionally or alternatively, a number of minimum vehicle values for different years and conditions of vehicles may be determined. Once the minimum vehicle value is determined, it is used to filter the available vehicle inventory. For each VIN (506), it is determined if the vehicle value is greater than or equal to the appropriate minim vehicle value (508). The appropriate minimum vehicle value is the vehicle value determined for the vehicle year and condition associated with the vehicle under consideration. If the vehicle value is greater than the minimum vehicle value (Yes at 508), the actual monthly and/or biweekly payments, or other payment schedule, are determined (510) according to the financial institution's requirements and the vehicle added to a list of eligible vehicles, along with the determined monthly amount (512). The method may also determine if the actual monthly and/or biweekly payments are within the desired range and only add those vehicles that are within the desired range to the list. Once the vehicle is added to the list, or if the vehicle value was less than the minimum vehicle amount (No at 508), the next VIN (514) is processed. Once all of the VINs have been processed the eligible vehicles may be returned (516) along with the calculated monthly and/or biweekly payments.

The above has described various processes for identifying vehicles that are eligible for the required financing of the purchaser and that meet the desired characteristics of the purchaser. It is possible that the desired characteristics of the purchaser result in no eligible vehicles, or in a limited number of eligible vehicles. In order to provide additional eligible vehicles to a purchaser, even though they may not match the desired vehicle characteristics, the eligible vehicles may be determined based on the financing requirements that is all of the vehicles that the purchaser can afford according to the financial institution are identified as eligible vehicles. The desired vehicle characteristics may be used to sort and/or filter the eligible vehicles. If the desired vehicle characteristics are too restrictive, one or more of the characteristics can be broadened or removed and the eligible vehicles sorted and/or filtered again according to the new characteristics.

Although the above has described using the VIN in order to determine a value of a vehicle, it is possible to determine a vehicle value even when the VIN is not available. In such scenarios, the vehicle value may be determined by its year, make, model, trim and add-ons, such as a sunroof and/or deducts, such as no air condition, as well as its mileage, which may determine what condition category the vehicle falls into. Further, the processing of vehicles may use additional or alternative identifiers for identifying the vehicle. For example, the processing of vehicles from the data store may utilize an internally unique identifier that identifies the vehicle record within the data store.

Figure 6:
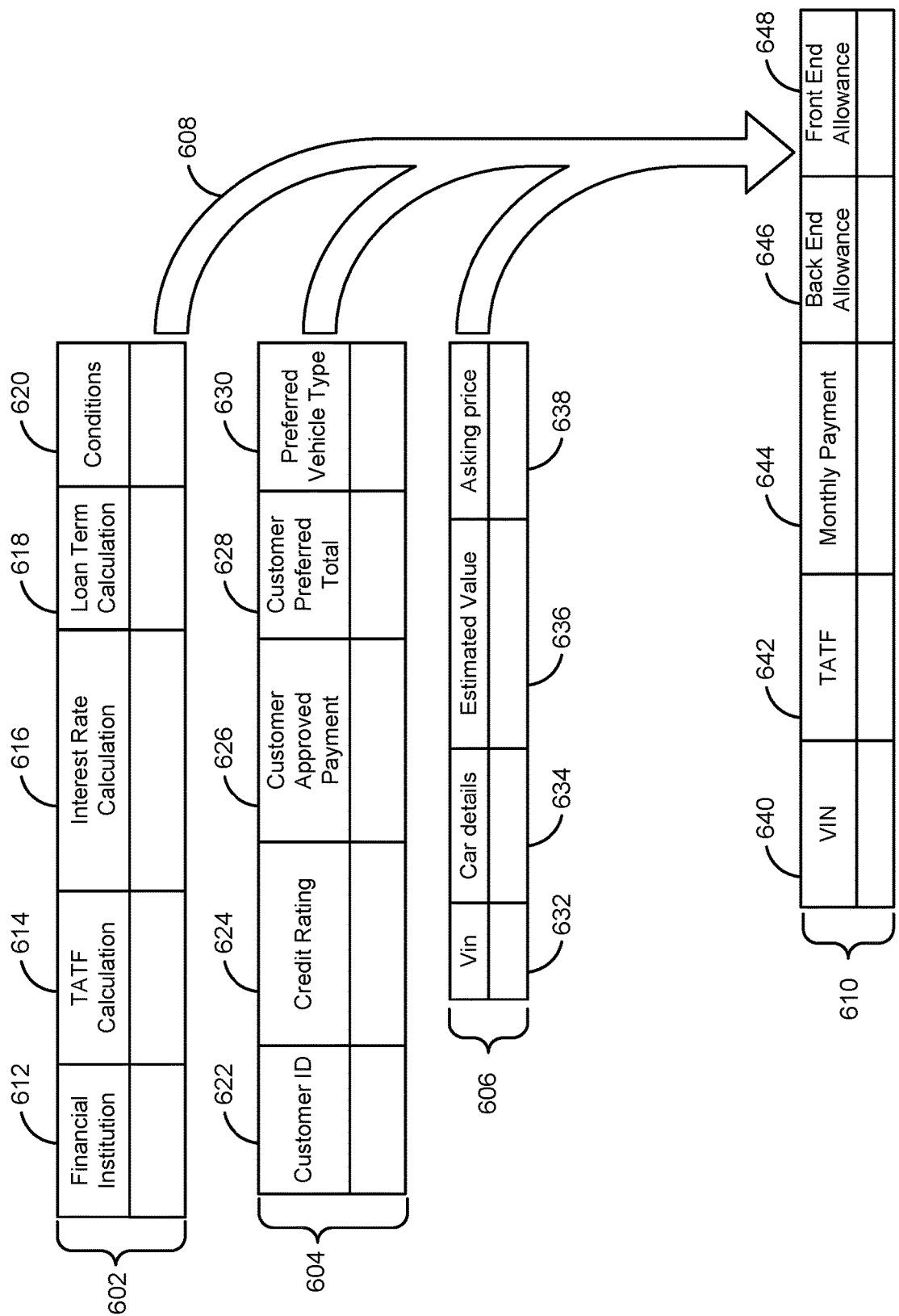
FIG. 6 depicts an illustrative display for identifying vehicles for a purchaser.

FIG. 6 depicts illustrative data used in identifying vehicles. The data includes booking requirements 602, purchaser financing information 604, available vehicle information 606 and eligible vehicle information 610. As depicted, the booking requirements 602, purchaser financing information 604, and the available vehicle information is processed 608 in order to produce the eligible vehicle information 610.

The booking requirement information may include, for example, a financial institution identifier 612 identifying the particular financial institution; an indication of how the financial institution calculates the total amount to finance 614, for example as a particular percentage of the vehicle value determined on the creditworthiness of the purchaser. The booking requirement information may further comprise an indication of how the financial institution determines the interest rate 616, for example based on a model year of a vehicle and the creditworthiness of the purchaser. The booking requirement information may further comprise an indication of how the financial institution determines the maximum loan term 618 for example based on a model year of the vehicle and the vehicle's condition and/or mileage. The booking requirement information may further comprise an indication of further conditions the financial institution has on providing loans to purchasers.

The purchaser financing information 604 may include, for example, a customer ID 622, a credit rating or other indication of the creditworthiness of the purchaser 624, approved payment amounts 626 which may include a total amount of financing the customer has been approved for and/or monthly payment amounts the customer has been approved for, desired payment amounts 628, which may include a desired total amount to finance and/or a desired monthly payment ranges. The purchaser financing information 604 may further include desired vehicle information providing an indication of a purchaser's preferred vehicle characteristics 630.

The available vehicle information 606 may be maintained to reflect the currently available inventory. The available vehicle information may include a VIN 632, vehicle details 636 such as the make, model, year, color, mileage, condition, options and extras, photos, notes etc. The available vehicle information may further include a value 636 as determined from one or more $3^{rd}$ party vehicle value providers, and an asking or purchase price 638.

The eligible vehicle information 610 may include, for example, a VIN 640, total amount to finance 642, an indication of the monthly payment 644, and an indication of the available backend allowance 646 as well as an indication of the available frontend allowance 648.

Figure 7:
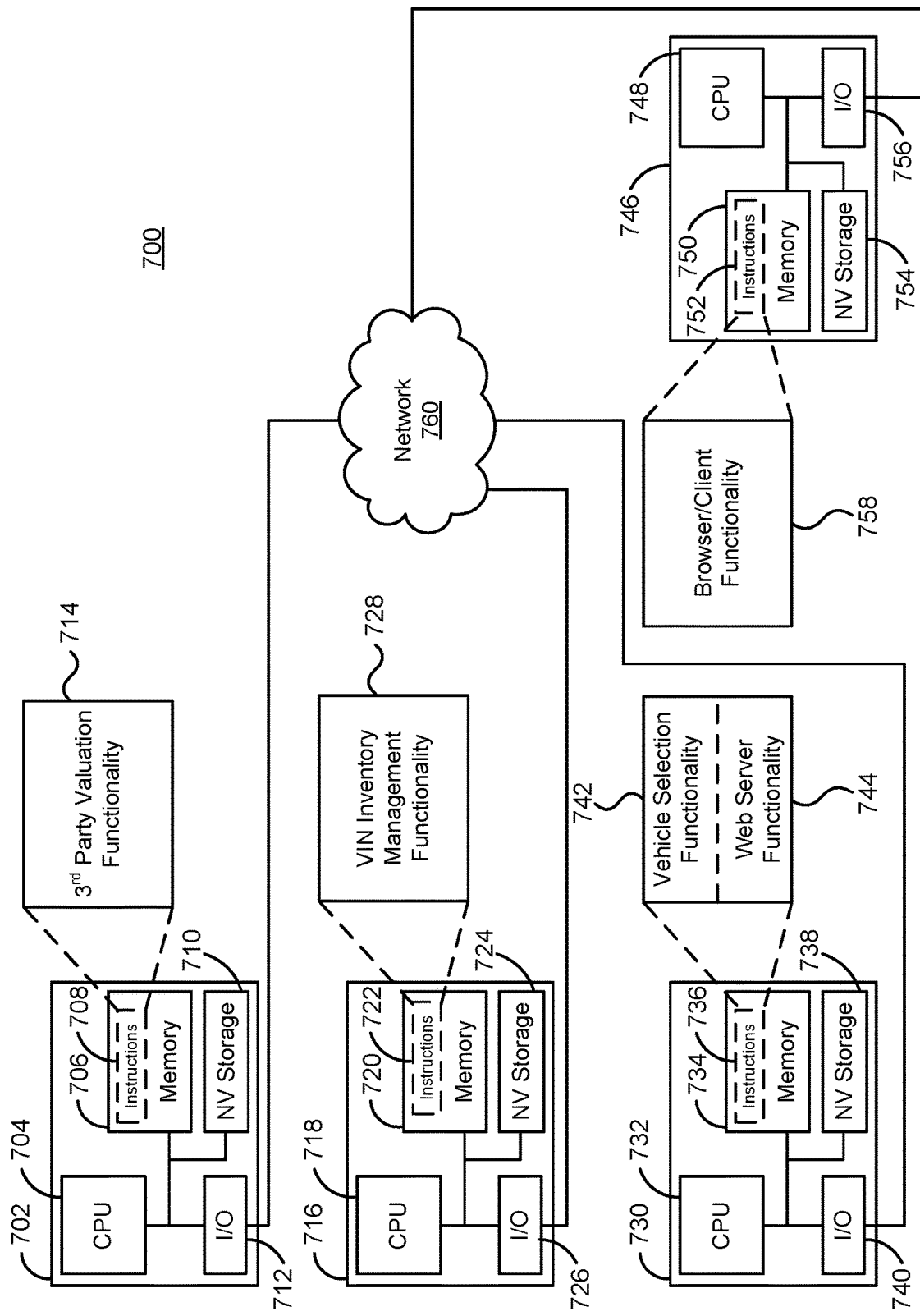
FIG. 7 depicts various apparatuses for use identifying vehicles for a purchaser.

FIG. 7 depicts various apparatuses for use identifying vehicles for a purchaser. As depicted, a number of computing apparatuses 702, 716, 730, 746 may be communicatively coupled by one or more networks 760. The computing apparatuses may be provided by individual systems or provided by one or more computing devices that are co-located, distributed or cloud-based service providers. The computing apparatus 702, may be a $3^{rd}$ party valuation computing apparatus. The computing apparatus 716, may be computing apparatus that provides information on available vehicle inventory. The computing apparatus 730, may be computing apparatus that provides the described vehicle selection functionality described herein. The computing apparatus 746, may be a client computing apparatus.

The computing apparatus 702 may comprise a central processing unit (CPU) 704, a memory 706 for storing instructions 708 and non-volatile storage 710. The computing apparatus 702 may further comprise one or more input/output I/O interfaces 712 for connecting input and/or output devices to the computing apparatus. For example, and I/O device may be a network interface for connecting the computing apparatus 702 to the network 760. The instructions 708 when executed by the CPU 704 may configure the computing apparatus to provide $3^{rd}$ party valuation functionality 714. The $3^{rd}$ party valuation functionality 714 may receive a VIN number and/or vehicle identifying information and return a value of the vehicle.

The computing apparatus 716 may comprise a central processing unit (CPU) 718, a memory 720 for storing instructions 722 and non-volatile storage 724. The computing apparatus 716 may further comprise one or more input/output I/O interfaces 726 for connecting input and/or output devices to the computing apparatus. For example, and I/O device may be a network interface for connecting the computing apparatus 716 to the network 760. The instructions 722 when executed by the CPU 718 may configure the computing apparatus to provide VIN inventory management functionality 728. The VIN inventory management functionality 728 may allow tracking of available vehicle information of vehicles that are for sale. The VIN inventory management functionality 728 may also include functionality for providing the inventory information to requesting computer apparatuses.

The computing apparatus 730 may comprise a central processing unit 732, a memory 734 for storing instructions 736 and non-volatile storage 738. The computing apparatus 730 may further comprise one or more input/output I/O interfaces 740 for connecting input and/or output devices to the computing apparatus. For example, and I/O device may be a network interface for connecting the computing apparatus 730 to the network 760. The instructions 736 when executed by the CPU 732 may configure the computing apparatus to provide the vehicle selection functionality 742 described herein. The executed instructions may further provide web server functionality 744.

The computing apparatus 746 may comprise a central processing unit 748, a memory 750 for storing instructions 752 and non-volatile storage 754. The computing apparatus 746 may further comprise one or more input/output I/O interfaces 756 for connecting input and/or output devices to the computing apparatus. For example, and I/O device may be a network interface for connecting the computing apparatus 746 to the network 760. The instructions 752 when executed by the CPU 748 may configure the computing apparatus to provide web browser functionality 758, or other client functionality for interacting with the vehicle selection functionality.

Figure 8:
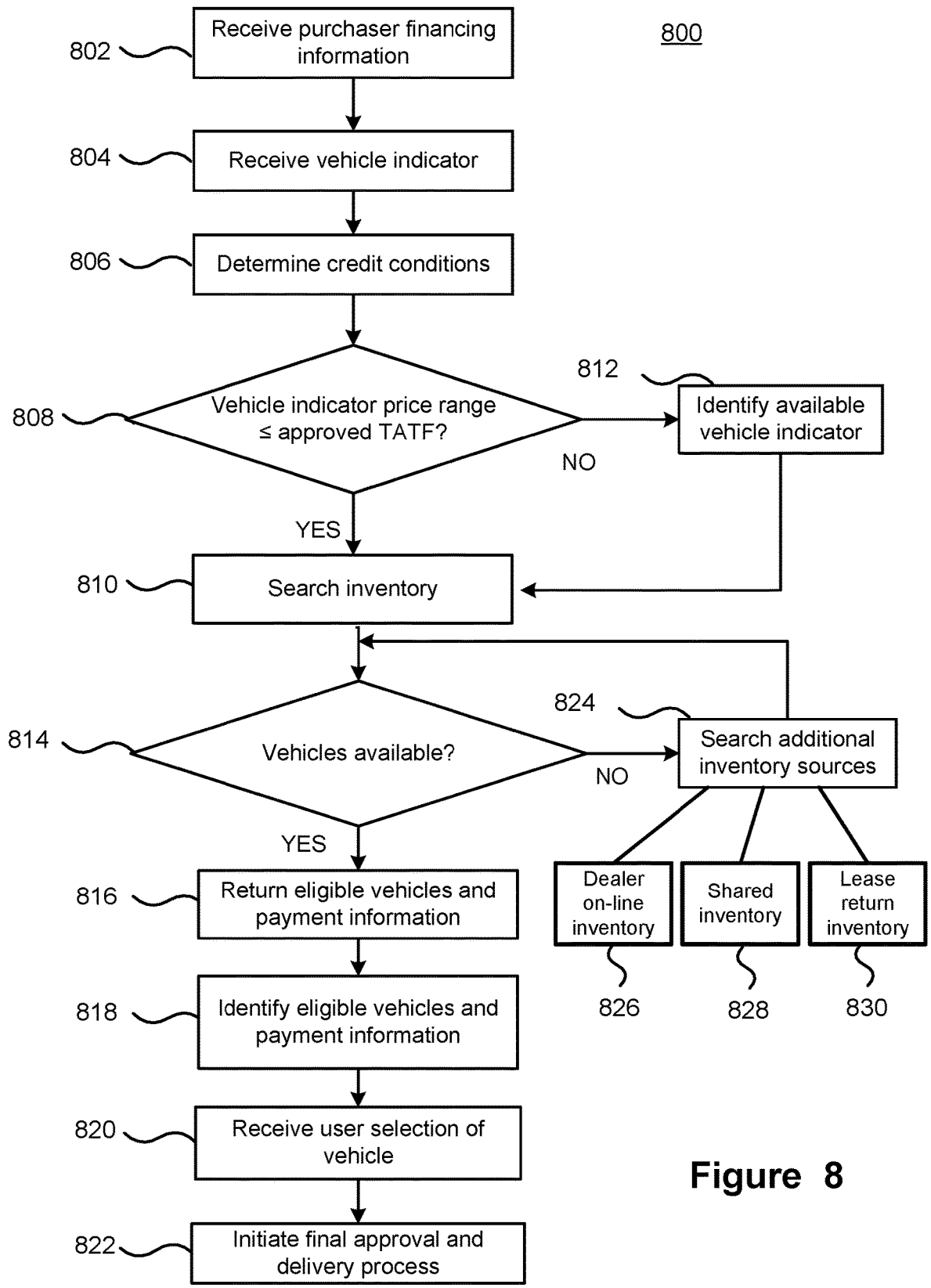
FIG. 8 depicts a method for identifying vehicles for a purchaser with pre-approval.

FIG. 8 depicts a further method for identifying vehicles for a purchaser/customer with financing pre-approval or pre-qualifying for financing. The method 800 is similar to the methods described above, however the purchaser can receive pre-approval prior to car selection directly through a financial institution or on-line vehicle purchasing website coupled to a financial institution. The purchaser may access a web-portal of the vehicle purchasing website or the financial institution to provide financial details to receive pre-approval by the financial institution by providing or accessing credit information (802). In addition to the credit information a vehicle indicator is received (804) which defines a value either associated with a vehicle, a specific type of vehicle, or price range of vehicles which the purchaser would like to consider purchasing. For example the indicator may define a specific price point, age of vehicle, general classification of the vehicle (e.g. Mini, Economy, Compact, Mid-Size, Full Size, Hybrid, Electric etc., which may include make, or model range or type of vehicle such as recreational, watercraft, RV, etc.). The indicator may also include the desired monthly payment or range of payments. From the financing information and the vehicle indicator, the approved credit conditions are determined (806) including the approved TATF. The credit conditions may also include an interest rate range based upon the financial institution lending guidelines which can be used by the system to determine appropriate vehicles. If the vehicle indicator price range is less than or equal to the approved TATF (YES at 808) the inventory of available vehicles can then be searched 810) to determine possible matches within the vehicle indicator defining the purchaser price range and preferences. The searching of the inventory provided in the vehicle repository is performed as previously described in methods 4 and 5.

If the vehicle indicator price range is above the approved TATF (NO at 808) the system performing the method can then identify a new vehicle indicator, such as a lower general classification within an approved price range to the purchaser. For example if the purchaser had selected the Compact vehicle class but does not meet the financing requirements, for example they would require a specified amount of money down to meet the financing institutions requirements or the monthly payments would be too high, a lower class such as the Economy vehicle class may be utilized to search the inventory (810) and the purchaser notified that their preferred vehicle indicator price range is not possible based upon the credit information. If vehicles are available within the vehicle indicator price range (YES at 814) the eligible vehicles and associated payment information is returned (816). If vehicles are not available within the vehicle indicator price range (NO at 814) additional inventory sources may be searched (824) such as for example additional dealer on-line inventories (826), shared inventories (828) and lease return inventories (830) additionally a dealer network, manufacturer network, online classified sites or any inventory available on the web. The system may also monitor for newly added vehicles to the inventory. Eligible vehicles and payment information can be presented to the purchaser through the web or application interface (818). The user can then select a vehicle for purchase (820). The delivery process can then be initiated (822) by processing the transaction through the financial institution by digital online contracting. The purchaser can be notified or a confirmation provided of the delivery process such as final approval by the financial institution, funds transfer, and delivery schedule.

The disclosed system can integrate with financing and tracking system such as for example Dealertrack™ and Route One™, to allow users to import and export auto finance deals between both systems. The system can also be integrated with all the third party vehicle evaluation companies (i.e. Canadian Black Book), Inventory Management Systems (i.e. CDK™, Reynolds and Reynolds™, PBS . . . etc.) and syndication platforms (i.e. Autotrader™, eDealer™, cDemo™, Kijiji™ . . . etc.) to bring the user a completely automated solution.

The present system contains visual content and which can be provided by short message service (SMS) or emailed to the purchaser that they can view on their mobile devices. The purchaser receives an SMS from system containing the units they are interested in, with pictures they can swipe through, with detailed information on the unit (ie AWD, mileage, color . . . etc.,) and they can communicate back and forth to the system through SMS messaging. A link can be provided by to a query result identifying vehicles available.

The integration of the system with $3^{rd}$ party automotive tracking and financing application such as DealerTrack™ is provided through an XML API which it allows purchaser data to be encoded and sent to the DealerTrack™ system, and after lenders have pre-approved a purchaser, allows them to export back that purchaser's updated data along with the pre-approval parameters of the lender.

The system allows for importing inventory data from multiple systems using multiple formats. Syndication is achieved through mutual conformance to a pre-defined method, data-format, and schedule. For example, syndication with AutoTrader™ is achieved by them exporting inventory data to an XML file and the system uses an inventory importer to access the file and parse its contents, pulling the data into the system. The extract, transfer, load (ETL) mechanism, allows multiple sources to be accessed that not only understands different types of data and how to extract it, but also can be pre-configured to run business rules on the data it is importing in order to enforce proper data hygiene, fill in missing or aggregate data, or just enforce a rule required by the individual dealership they could not achieve through their system.

Although the above discloses example methods, apparatus including, among other components, software executed on hardware, it should be noted that such methods and apparatus are merely illustrative and should not be considered as limiting. For example, it is contemplated that any or all of these hardware and/or software components could be embodied exclusively in hardware, exclusively in software, exclusively in firmware, or in any combination of hardware, software, and/or firmware. Accordingly, while the following describes example methods and apparatus, persons having ordinary skills in the art will readily appreciate that the examples provided are not the only way to implement such method and apparatus. For example, the methods may be implemented in one or more pieces of computer hardware, including processors and microprocessors.

The present disclosure has described various systems and methods with regard to one or more embodiments. However, it will be apparent to persons skilled in the art that a number of variations and modifications can be made without departing from the teachings of the present disclosure.

What is claimed is:

1. A method for determining eligible vehicles for a purchaser, executed by a computing device, the method comprising:

receiving purchaser financing information associated with a purchaser of a vehicle;

receiving a vehicle indicator associated with the purchaser defining at least one vehicle value;

determining credit conditions associated with the purchaser financing information from a financial institution including a credit worthiness score;

searching a vehicle inventory source identifying a plurality of available vehicles and associated vehicle inventory information using the vehicle indicator and a total amount to finance (TATF) from the credit conditions and a determined value of a respective vehicle in the vehicle inventory information; and returning a subset of eligible vehicles determined from the vehicle inventory source complying with financing booking requirements for the financial institution to a computing device of the purchaser for display thereon.

2. The method of claim 1 wherein searching the vehicle inventory source further comprises determining a vehicle value from a vehicle value provider using a vehicle identification number.

3. The method of claim 1 wherein the vehicle inventory source is a vehicle inventory associated with one or more vehicle dealerships.

4. The method of claim 1 wherein the vehicle inventory source is a vehicle inventory associated with one or more on-line vehicle selling collection websites.

5. The method of claim 1 wherein the vehicle inventory sources comprises multiple vehicle inventory sources.

6. The method of claim 1 wherein the credit worthiness score is determined by the financial institutions based upon a credit history associated with the purchaser.

7. The method of claim 5 wherein a credit history is retrieved from a credit bureau.

8. The method of claim 1 wherein the credit worthiness is further determined by one of age, education, income or job description by the financial institution.

9. The method of claim 1 wherein searching the vehicle inventory source further comprises:
    determining a minimum vehicle value required to provide desired or approved financing amount or desired or approved monthly payments based upon financing booking requirements associated with a financial institution and the purchaser financing information;
    determining a fixed interest rate from the finance booking requirements based on a model year of the respective vehicle for the purchaser; and
    calculating a payment amount based on at least the fixed interest rate and the determined value of the respective vehicle for a defined term.

10. The method of claim 1 wherein searching the vehicle inventory source comprises:
    processing the vehicle inventory source identifies a plurality of available vehicles and associated vehicle inventory information, to identify from a plurality of available vehicles a subset of eligible vehicles eligible for the purchaser for each vehicle having an associated vehicle identification number (VIN) above a minimum vehicle value:
    calculating actual monthly payments for the vehicle associated with a respective VIN; and
    adding the vehicle and monthly payments to the subset of eligible vehicles for purchase when the calculated actual monthly payments is equal to or below a desired or approved monthly payments.

11. The method of claim 1 wherein the vehicle is added to the subset of eligible vehicles when the TATF is greater than or equal to the determined value associated with the respective vehicle and a calculated payment amount is less than or equal to a specified payment amount.

12. The method of claim 1, wherein for each eligible vehicle further determining a maximum loan term based on a condition of the vehicle, and wherein determining a payment amount comprises determining a recurring payment amount based on a determined fixed rate interest and the maximum loan term.

13. The method of claim 12, wherein the maximum loan term is further based on mileage of the vehicle.

14. The method of claim 1, wherein the finance booking requirements specify:
    fixed interest rates based on a model year of the vehicle and a plurality of credit ratings;
    maximum recurring payments based on the plurality of credit ratings; and
    maximum amounts to finance based on vehicle value and the plurality of credit ratings.

15. The method of claim 1, further comprising:
    for each of the eligible vehicles for the purchaser, determining additional financing amounts by:
        determining a backend financing amount available from the finance booking requirements and the determined vehicle value associated with the respective vehicle; and
        determining a frontend financing amount available from a difference between the TATF and the determined value of the respective vehicle.

16. The method of claim 1, wherein the vehicle inventory source of a plurality of available vehicles and associated vehicle inventory information stores for each vehicle:
    a unique vehicle identification number (VIN)
    a make of the vehicle;
    a model of the vehicle;
    a model year of the vehicle;
    a trim level of the vehicle; and
    mileage of the vehicle.

17. The method of claim 1, further comprising:
    periodically updating the vehicle inventory source to add vehicle inventory information of newly available vehicles and removing unavailable vehicles; and
    determining a book value for any newly added vehicles from at least one more 3rd party valuation services.

18. The method of claim 1 further comprising:
    receiving a selection of a vehicle from the eligible vehicles;
    initiating a final approval and delivery process for the purchaser; and
    sending a confirmation to the computing device of the purchaser.

19. A system for determining eligible vehicles for a purchaser comprising:
    a processor coupled to one or more vehicle inventory source computing devices through a network;
    a memory coupled to the processor, the memory containing instructions to:
        receive purchaser financing information associated with a purchaser of a vehicle;
        receive a vehicle indicator associated with the purchaser defining at least one vehicle value;
        determine credit conditions associated with the purchaser financing information from a financial institution;
        search a vehicle inventory source identifying a plurality of available vehicles and associated vehicle inventory information using the vehicle indicator and a total amount to finance (TATF) from the credit conditions and a determined value of a respective vehicle in the vehicle inventory information; and
        return a subset of eligible vehicles determined from the vehicle repository complying with financing booking requirements for the financial institution to a computing device of the purchaser for display thereon.

20. A non-transitory computer readable memory containing instructions which when executed by a processor performs a method of determining eligible vehicles for a purchaser, the method comprising:

receiving purchaser financing information associated with a purchaser of a vehicle;

receiving a vehicle indicator associated with the purchaser defining at least one vehicle value;

determining credit conditions associated with the purchaser financing information from a financial institution;

searching a vehicle inventory source identifying a plurality of available vehicles and associated vehicle inventory information using the vehicle indicator and a total amount to finance (TATF) from the credit conditions and a determined value of a respective vehicle in the vehicle inventory information; and returning a subset of eligible vehicles determined from the vehicle inventory source complying with financing booking requirements for the financial institution to a computing device of the purchaser for display thereon.

\* \* \* \* \*